US009944798B2

(12) United States Patent
Buri et al.

(10) Patent No.: US 9,944,798 B2
(45) **Date of Patent: *Apr. 17, 2018**

(54) COMPOSITE OF INORGANIC AND/OR ORGANIC MICROPARTICLES AND NANO-DOLOMITE PARTICLES

(75) Inventors: Matthias Buri, Rothrist (CH); Patrick A. C. Gane, Rothrist (CH); René Vinzenz Blum, St. Urban (CH)

(73) Assignee: Omya International AG, Oftringen (CH)

(*) Notice: Subject to any disclaimer, the term of this patent is extended or adjusted under 35 U.S.C. 154(b) by 825 days.

This patent is subject to a terminal disclaimer.

(21) Appl. No.: 12/227,031

(22) PCT Filed: Jun. 5, 2007

(86) PCT No.: PCT/EP2007/055523

§ 371 (c)(1), (2), (4) Date: Nov. 18, 2008

(87) PCT Pub. No.: WO2007/141271

PCT Pub. Date: Dec. 13, 2007

(65) Prior Publication Data

US 2009/0169894 A1 Jul. 2, 2009

(30) Foreign Application Priority Data

Jun. 9, 2006 (DE) ........................ 10 2006 026 965
Jan. 26, 2007 (DE) ........................ 10 2007 004 124

(51) Int. Cl.

*B32B 5/16* (2006.01)
*B05D 7/00* (2006.01)
(Continued)

(52) U.S. Cl.

CPC .............. *C09C 3/063* (2013.01); *B82Y 30/00* (2013.01); *C09B 67/0013* (2013.01);
(Continued)

(58) Field of Classification Search

None
See application file for complete search history.

(56) References Cited

U.S. PATENT DOCUMENTS 4,187,192 A * 2/1980 Sheridan ........................ 516/79
4,219,365 A 8/1980 Dietz et al.
(Continued)

FOREIGN PATENT DOCUMENTS

DE 33 12778 A1 11/1983
DE 43 12 463 C1 7/1994
(Continued)

OTHER PUBLICATIONS

Yang et al., Nanostructure modification of mineral particle surface in Ca(OH)2—H2O—CO2 system, J. Mater. Proc. Tech., 170 (2005) 58-63.*

(Continued)

*Primary Examiner* — Alexandre F Ferre
(74) *Attorney, Agent, or Firm* — Amster, Rothstein & Ebenstein LLP

(57) ABSTRACT

The present invention relates to composites, comprising inorganic and/or organic pigments and/or fillers in the form of microparticles, the surface of which is coated at least partially with finely divided nano-dolomite with the help of binders based on copolymers comprising as monomers one or more dicarboxylic acids and one or more monomers from the group of diamines, triamines, dialkanolamines or trialkanolamines, a method for producing such composites, aqueous slurries thereof, their use, and the use of the inventive binders for coating the microparticles with nano-dolomite.

54 Claims, 8 Drawing Sheets

(51) Int. Cl.

| | |
|---|---|
| ***C09C 3/06*** | (2006.01) |
| ***B82Y 30/00*** | (2011.01) |
| ***C09B 67/08*** | (2006.01) |
| ***C09C 1/00*** | (2006.01) |
| ***C09C 1/40*** | (2006.01) |
| ***C09C 1/42*** | (2006.01) |
| ***D21H 19/42*** | (2006.01) |
| *D21H 21/52* | (2006.01) |

(52) U.S. Cl.

CPC ............ *C09C 1/0081* (2013.01); *C09C 1/405* (2013.01); *C09C 1/42* (2013.01); *D21H 19/42* (2013.01); *C01P 2004/03* (2013.01); *C01P 2004/32* (2013.01); *C01P 2004/34* (2013.01); *C01P 2004/36* (2013.01); *C01P 2004/61* (2013.01); *C01P 2004/62* (2013.01); *C01P 2004/64* (2013.01); *C01P 2006/22* (2013.01); *D21H 21/52* (2013.01); *Y10T 428/2998* (2015.01)

(56) References Cited

U.S. PATENT DOCUMENTS

| | | | | |
|---|---|---|---|---|
| 4,547,331 | A | 10/1985 | Batstra | |
| 5,076,846 | A | 12/1991 | Buri et al. | |
| 5,120,365 | A | 1/1992 | Kogler | |
| 5,152,835 | A | 10/1992 | Nemeh | |
| 5,169,441 | A * | 12/1992 | Lauzon | 106/416 |
| 5,229,094 | A | 7/1993 | Clauss et al. | |
| 5,230,734 | A * | 7/1993 | Kumasaka et al. | 106/464 |
| 5,344,487 | A | 9/1994 | Whalen-Shaw | |
| 5,401,482 | A | 3/1995 | Clauss et al. | |
| 5,439,558 | A | 8/1995 | Bergmann et al. | |
| 5,449,402 | A | 9/1995 | Whalen-Shaw | |
| 5,454,864 | A * | 10/1995 | Whalen-Shaw | 106/416 |
| 5,472,498 | A | 12/1995 | Stephenson et al. | |
| 5,509,960 | A | 4/1996 | Simpson | |
| 5,554,215 | A | 9/1996 | Simpson | |
| 5,584,924 | A | 12/1996 | Arrington-Webb et al. | |
| 5,605,568 | A | 2/1997 | Naydowski et al. | |
| 5,662,731 | A | 9/1997 | Anderson et al. | |
| 6,143,064 | A * | 11/2000 | Virtanen | 106/449 |
| 6,666,953 | B1 | 12/2003 | Gane et al. | |
| 2004/0020410 | A1 | 2/2004 | Gane et al. | |
| 2005/0006041 | A1* | 1/2005 | Gane et al. | 162/135 |
| 2005/0119391 | A1* | 6/2005 | Mason et al. | 524/445 |
| 2005/0287313 | A1* | 12/2005 | Chen et al. | 428/32.34 |
| 2006/0045997 | A1 | 3/2006 | Hladik et al. | |
| 2007/0185258 | A1 | 8/2007 | Suau et al. | |
| 2007/0249758 | A1 | 10/2007 | Suau et al. | |

FOREIGN PATENT DOCUMENTS

| | | | |
|---|---|---|---|
| EP | 0 507 362 | A1 | 10/1992 |
| EP | 0 332 102 | B1 | 9/1994 |
| EP | 0 585 411 | B1 | 12/1995 |
| EP | 0 625 611 | B1 | 11/1997 |
| EP | 0 401 790 | B1 | 4/1998 |
| EP | 1 072 650 | A1 | 1/2001 |
| FR | 2 413 448 | | 7/1979 |
| FR | 2 526 061 | | 11/1983 |
| GB | 839712 | | 6/1960 |
| JP | 59-120657 | | 12/1984 |
| JP | 02-006560 | | 1/1990 |
| JP | 6-507195 | | 12/1992 |
| JP | 09-132514 | | 5/1997 |
| JP | 02-242998 | | 2/2010 |
| WO | WO 96/02468 | | 2/1992 |
| WO | WO 92/08755 | A | 5/1992 |
| WO | WO 92/19685 | | 12/1992 |
| WO | WO 96/28517 | | 9/1996 |
| WO | WO 97/32934 | A | 9/1997 |
| WO | WO 99/52984 | | 10/1999 |
| WO | WO 0100712 | A1 * | 1/2001 |
| WO | WO 03/078734 | A | 9/2003 |
| WO | WO 2006/109168 | A2 | 10/2006 |
| WO | WO 2006/109171 | A1 | 10/2006 |
| WO | WO 2007/141260 | A1 | 12/2007 |

OTHER PUBLICATIONS

Imerys (Dolomite properties, available at http://www.imerys-perfmins.com/dolomite/eu/dolomite.htm, last visited on Mar. 9, 2014).*

Rothon, Particulate-filled Polymer Composites, Rapra Technology Limited, Section 2.2.5: Dolomite, 2003.*

Yang et al., "Nanostructured Modification of Mineral Particle Surfaces in Ca(OH)2—H2)—CO2 System." Journal of Materials Processing Technology, 170:1-2, pp. 58-63, Dec. 2005.

The International Search Report for PCT Application No. PCT/EP2007/055523.

The Written Opinion for PCT Application No. PCT/EP2007/055523.

* cited by examiner

10mm
2 µm
41140 / 35

COMPOSITE OF INORGANIC AND/OR ORGANIC MICROPARTICLES AND NANO-DOLOMITE PARTICLES

This is a U.S. national phase of PCT Application No. PCT/EP2007/055523, filed Jun. 5, 2007, and claims priority to German Application Nos. 102006026965.9, filed Jun. 9, 2006 and 102007004124.3, filed Jan. 26, 2007.

FIELD OF THE INVENTION

The present invention relates to composites, comprising inorganic and/or organic pigments and/or fillers in the form of microparticles whose surface is coated with the help of binders at least partially with finely divided dolomite particles in the nanometer range, a method for producing such composites, aqueous slurries thereof and use thereof in papermaking or in the field of production of paints and plastics as well as the use of the inventive binders for coating the microparticles with nano-dolomite.

BACKGROUND OF THE INVENTION

Pigments and/or fillers based on particles in the nanometer range (so-called nanoparticles) such as, fore example, nano-calcium carbonate are known and are used in numerous applications including paper, paint and plastics applications. Organic and/or inorganic pigments and/or fillers in the micrometer range (so-called microparticles) such as hollow spheres or solid particles based on polystyrene, and inorganic mineral particles such as talc-, mica- or kaolin based pigments and/or fillers are also known and are used in the same or similar applications.

Mixtures of nanoparticles and microparticles of different chemical compositions are used because they have certain different properties which are advantageous to combine to impart the desired properties to the end product, e.g., paper. Mixtures of such substances are used, e.g., as pigments or fillers in papermaking but especially in paper finishing as in coating, e.g., to improve the quality of the paper with regard to the opacity, whiteness and gloss of the paper or the printability and printing properties. It is known that the properties of such microparticles and nanoparticles with regard to retention in papermaking and coating "holdout" in paper finishing, e.g., paper coating can be combined advantageously. Coating holdout is understood by those skilled in the art to refer to whether the coating remains on the paper surface or penetrates partially to completely into the paper surface or whether a portion, e.g., the binder and/or a pigment or a partial fraction of a pigment is segregated from the whole and penetrates into the paper surface. This is a problem with which those skilled in the art are familiar, especially in coating an absorbent substrate using coating colours with a low solids content.

When using mixtures of such microparticles and nanoparticles in such applications, an unwanted separation of components, so-called segregation, unfortunately occurs frequently and is associated with an uneven distribution of the coating with regard to the coating thickness on the surface underneath, the underlying pre-coating or the paper surface, which may thus lead to an uneven printing on the paper, for example. The term "segregation" refers to the process of separation of different elements in an observation field with a tendency toward spatial distribution of the elements according to certain properties.

Segregation of pigment and/or filler mixtures results in differences in pore volume in the coating, e.g., in finishing the paper by coating, because the free nanoparticles become segregated from the microparticles and therefore may either occupy the pores of the paper and/or the coating or "float" there, i.e., collect primarily in the upper area of the coating, for example, which is important in particular when the coating should absorb a certain volume of liquid such as water, oil and/or organic solvents from the printing ink in the subsequent printing.

A number of such mixtures, their production and use are known in the state of the art, describing mainly calcium carbonate as nanoparticles.

A widely used technique for producing such pigment or filler mixtures is described in DE 33 12 778 A1 and DE 43 12 463 C1, for example, and consists of mixing and joint grinding of a mineral filler such as natural calcium carbonate with a mineral filler such as talc.

However, under the conditions of papermaking or coating, such mixtures are usually subject to segregation because the bonds between the components of the mixture often do not withstand these conditions. It is known that shear rates of more than $10^6$ $sec^{-1}$ may occur in coating with the doctor blade at 1500 m/min.

Therefore, additional methods for producing such composites have been developed based on crosslinking between the pigment and/or filler particles, where numerous internal cavities are formed that should improve the physical properties and especially the optical properties of the pigments and/or fillers.

Thus, a method for forming chemically aggregated porous pigment composites is described in WO 92/08755, where an aqueous slurry of mineral particles such as calcium carbonate is prepared and a polymer or copolymer containing carboxylic acid groups is added to the slurry to cause flocculation. Calcium ions are added in excess to the slurry to induce precipitation of the calcium salt of the polymer on the mineral flocks and therefore produce aggregates of the mineral particles that are bonded by the calcium salt and have a porous flaky structure. The excess calcium ions are reacted with carbon dioxide and precipitated as calcium carbonate on the polymeric calcium salt. However, since the calcium ions are added in the form of alkaline chemical compounds such as calcium hydroxide, they form alkaline intermediates that can have negative effects, e.g., when using certain dispersants. In addition, further precipitation of calcium carbonate alters the structure of the original nanoparticle/microparticle structure and necessarily leads to the introduction of another pigment, namely the precipitated calcium carbonate formed by neutralization. Flocculated aggregates can be problematical in general in paper applications because they cause diffuse light scattering on the surface which leads to loss of the paper gloss. In addition, the pore volume of the composite to be achieved originally is influenced and altered first by the flocculation and secondly by the precipitated calcium carbonate thus formed.

U.S. Pat. No. 5,449,402 describes functionally modified pigment particles that are produced by mixing of flocculated pigments such as calcium carbonate with a regulator substance having an opposite charge from the charge of the flocculated pigment. The flocculated pigment is preferably an aqueous suspension of filter cake particles. Preferred regulator substances include water-insoluble or dispersible latex binders, water-soluble or alkali-soluble organic and/or inorganic polymer binders and non-film-forming organic particles that are electrostatically bound to the pigment particles when mixed with them.

U.S. Pat. No. 5,454,864, U.S. Pat. No. 5,344,487 and EP 0 573 150 also describe pigment composites whose production is based on electrostatic attraction forces between the carrier particles and the coating particles. However, the use of such composites may be problematical in the respective applications because of interactions with other charged components.

Another method for improving whiteness according to WO 97/32934 consists of coating the pigment particles with other pigment particles such as finely divided particles of precipitated calcium carbonate which are initially present in the form of agglomerates, but without using a binder, which can lead to the problems mentioned above such as flocculation. The stability of these composites is based essentially on the forces of attraction such as van der Waals forces that can develop only when certain very specific conditions are met. For example a defined pH must be maintained exactly to obtain the best possible zeta potential, which is different for each combination of substances. As soon as the conditions deviate from the optimal, the forces of repulsion become predominant and the components undergo segregation.

WO 99/52984 pertains to composite compositions of costructured or coadsorbed fillers which contain at least two different types of mineral or organic fillers or pigments, e.g., from calcium carbonate, talc or polystyrene and use thereof. The different types of pigments or fillers have hydrophilic and/or organophilic regions which allow binding to take place by way of special binders. The binders, which must have an affinity for the hydrophilic components as well as the organophilic components to manifest their binding function, are selected from special polymers and/or copolymers. The particle diameter of the pigments and/or fillers used does not play a role here inasmuch as no diameter is mentioned explicitly and/or all the particle diameters mentioned in the examples are less than 1 μm in the best case.

WO 03/078734 discloses a composition for surface treatment, in particular for coating paper, containing a nanoparticle fraction, e.g., of precipitated calcium carbonate, and a carrier fraction comprising platelet-like pigment particles, including talc or plastic pigment particles and at least one binder. However, the nanoparticles do not coat the carrier. By targeted arrangement of the platelet-like microparticles on the paper surface, pores are closed and nanoparticles can no longer penetrate. It is describes how the platelet-like microparticles migrate to the paper surface due to segregation and thereby close pores between the fibres and thus prevent the nanoparticles from being able to penetrate into the surface. Thus targeted segregation of nanoparticles and microparticles is a goal. Microparticles segregate from the nanoparticles and are situated at the bottom of the coating while nanoparticles are at the top of the coating. The binder, preferably a polymer latex binder, causes the bond to form between individual particles and the two particle fractions at the top and bottom of the coating when the coating dries on the paper. The desired segregation has already taken place at this point in time.

US 2005/0287313 relates to the subject of fusible print media based on a substrate and an ink-absorbing layer on the substrate. The ink-absorbing layer comprises a plurality of hollow spheres, e.g., polystyrene hollow spheres which have essentially the same diameter which may be 0.3 to 10 μm. The layer also includes binders such as polyvinyl alcohol or polyvinylpyrrolidone and the like to bond the hollow spheres together. The hollow spheres may also be partially replaced by microporous and/or mesoporous inorganic particles such as calcium carbonate or talc as well as polymer particles that are not hollow and may have a diameter of 0.2 to 5 μm. US 2005/0287313 thus describes a mixture of microparticles that are present concurrently and held together by fixation in a binder tailored to the requirements of the melting process. It is a type of pickling bath which may consist of certain cationic polymers and copolymers containing amino groups and is fed to ensure a better chemical interaction between a dye-based ink and the ink absorbing layer. It does not play any role with regard to the binding of the different components within the layer. The problem of segregation is not mentioned.

WO 2006/016036 relates to, among other things, a method for grinding mineral materials in water in the presence of binders and the resulting suspensions as well as the use thereof in coating formulations. A large number of materials such as talc that can be ground in the presence of binders are mentioned in the description and claims. However, the examples use only calcium carbonates. In none of the examples grinding of, for example, two chemically different materials in the presence of a binder is disclosed. Furthermore, there is no mention of the fact that nanoparticles are formed or nanomicrocomposites are produced by this grinding method. The binder is not used to produce a composite but instead as a grinding aid for finer grinding, but the average diameter of the particles in the pigment suspensions may be up to 30 μm. The binders used for grinding may be based on styrene-acrylate or styrene-butadiene, i.e., these are binders with which those skilled in the art are well familiar such as those used in coating papers or as binders in wall paint. Thus, the method described in WO 2006/016036 obligatorily includes a grinding step which yields particles essentially in the micro range and it does not describe a binder that allows the formation of an essentially segregation-resistant composite.

DE 10 2006 026 965 describes composites comprising inorganic and/or organic pigments and/or fillers in the form of microparticles, the surface of which is coated at least partially with the help of binders with calcium carbonate particles in the nanometer range, a method for the production of such composites, aqueous slurries thereof and their use in the paper production or in the field of paint and plastic production and the use of these binders for coating the microparticles with nano-calcium carbonate. The use of dolomite particles is not mentioned.

WO 2006/033952 describes a material of paper and board comprising a substrate of paper or board, a basic layer on top of at least one substrate surface and a top layer on top of a surface of the basic layer, wherein said top layer comprises one or more pigments being dispersed in one or more binders, and said basic layer comprises thermoplastic particles having a low density such as the plastic particles Ropaque® HP-1055 and AF-1353 of Rohm and Haas and HS 2000NA and HS 3000NA of Dow Chemical Company, which are dispersed in one or more binders. The basic layer is compressible reducing the back trap mottling in offset printed pictures. Pigment particles such as calcium carbonate and plastic particles thus are present in separate layers. All of said compositions of the state of the art particularly describe calcium carbonate as one component. Calcium carbonate, however, is not acid-resistant and decomposes under the influence of acids forming carbon dioxide and calcium salts of the corresponding acid used. Many, especially paper applications and manufacturing processes such as fibre bleaching are performed in an at least slightly acidic environment such that the sensitivity to acids of calcium carbonate in such procedural steps may represent a significant problem. For example, water hardness thus can be extremely increased, which in turn can lead to deposits later in the paper manufacturing process. It is also possible that acidic food such as fruit, e.g. lemons are exposed to packaging paper, which may lead to an undesired deposit of calcium salts on the food. In addition filtering of liquid acidic food and beverages such as vinegar is not possible with the materials mentioned above being acid sensitive.

SUMMARY OF THE INVENTION

The object of the present invention is thus to provide further pigment and/or filler composites as well as aqueous slurries as well as filter layers thereof which on the one hand will have very good optical properties, e.g., with regard to opacity, whiteness and brightness or printing properties while at the same time being subject to no or essentially no segregation under the processing conditions to which they are exposed and have an improved acid stability in comparison with composites containing materials having a high content of calcium carbonate such as marble, limestone, chalk and precipitated calcium carbonate.

They should be stable at least in weak acids having a $pK_a$ of >4 such as, e.g., acetic acid, but should also be stable at least for a short time in media containing substances reacting acidic such as phenolic or phenol-formaldehyde or urea-formaldehyde resins, but also substances producing acid as a reaction product during cross-linking such as polymers containing silicon, i.e. a chemical reaction, e.g. a condensation reaction/cross-linking reaction lasting in the range of 1 to 60 min. should not be impaired significantly. In particular, condensation polymerisations can produce, e.g. acetic acid as a condensation product.

It is a further object of the invention to provide a filtering aid, which can be used for slightly acidic liquids, in the form of a single filter layer or applied in and/or on fibres as a filtering aid supporting the actual fibre material. The goal is on the one hand to avoid the impairment of the liquid to be filtered and on the other hand to allow for a fast, efficient filtration.

Another object of the present invention is to provide a method for producing such composites, the use of these composites according to the present invention in papermaking and finishing, e.g., coating.

In addition, an object of the present invention is the use of the inventive composites in the production of paints or plastics, in sealing substances and the use of certain binders being especially suitable for the production of the inventive composites containing pigment and/or filler microparticles and dolomite nanoparticles.

The features defined in the independent claims are used to achieve these objects.

Advantageous aspects of the present invention are derived from the subclaims and the following description.

BRIEF DESCRIPTION OF THE FIGURES

The figures described below are scanning electron micrographs (SEM) of the various mixtures of the state of the art and inventive composites. The mixtures and the inventive composites were adjusted to a concentration of 20 wt % in water using an ultraturax (rotor-stator-mixer). A few drops (approximately 100 mg) were diluted in 250 mL distilled water and filtered through 0.2 μm pore membrane filter. Preparations obtained on the membrane filter in this way were sputtered with gold and evaluated in the SEM at various enlargements.

DETAILED DESCRIPTION OF THE INVENTION

Figure 1:
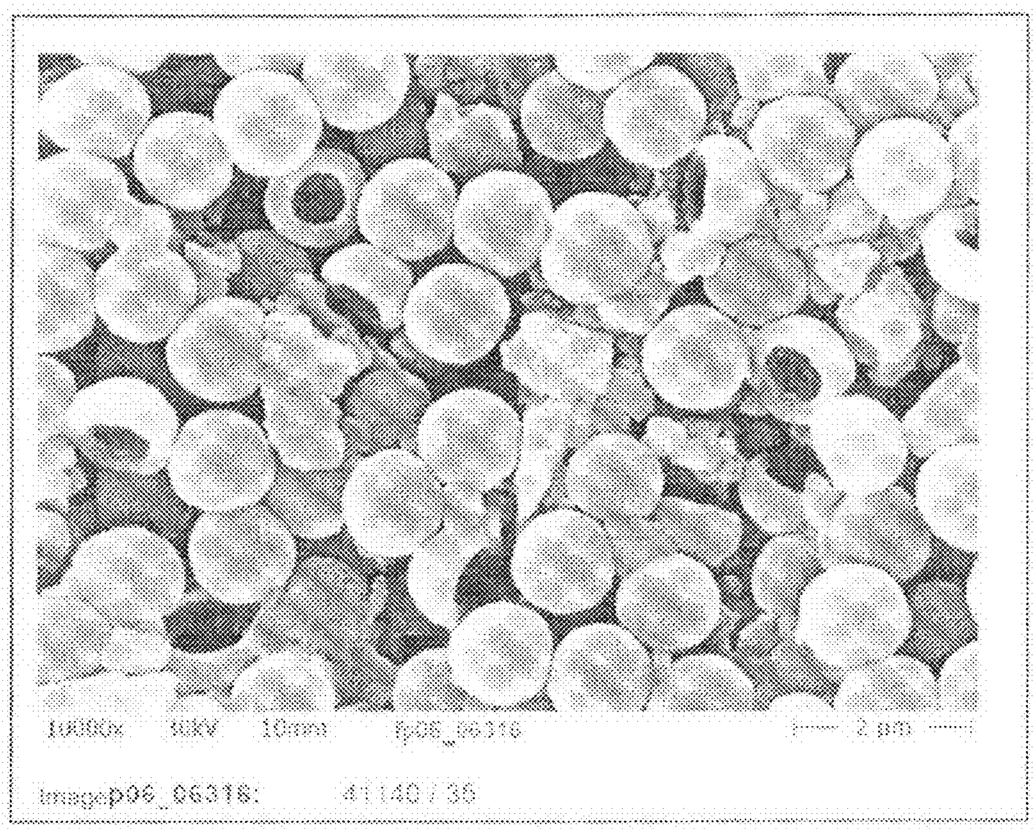
FIG. 1 shows an SEM of a mixture of organic microparticles and nano-calcium carbonate without a binder.

The object of the invention is achieved by a composite, comprising inorganic and/or organic pigment and/or filler particles which are coated at least partially with a dolomite composition, and a binder.

The binder consists of a copolymer comprising as monomers one or more dicarboxylic acids and one or more monomers from the group of diamines, triamines, dialkanolamines or trialkanolamines.

The inventive binder has especially good binder properties in combination with the microparticles and the nano-dolomite compositions. A large portion of the nano-dolomite composition used is permanently bound to the surface of the microparticle, which allows an open structure in use of the composite and thus allows a reduction in packing density and/or an increase in pore volume, among other things.

According to this invention, the spherical equivalent diameter of the pigment and/or filler particles is primarily in the micrometer range, while the spherical equivalent diameter of the dolomite particles is primarily in the nanometer range.

A particle in the nanometer range is defined within the scope of this invention as a particle having a spherical equivalent diameter in the sub-micron range of less than or equal to 200 nm.

A particle in the micrometer range is defined according to this invention as a particle having a spherical equivalent diameter in the sub-micron range of greater than 0.2 μm up to the micrometer range, about 0.3 to 100 μm, in particular from about 1 to about 25 μm.

The so-called spherical equivalent diameter is a measure of the size of an irregularly shaped particle. It is calculated from a comparison of a property of the irregular particle with a property of a regularly shaped particle, e.g. a sphere. Depending on the choice of property used for comparison, a distinction is made between different equivalent diameters. In the present case the equivalent diameter is considered with respect to the sedimentation properties of the particles investigated.

The sedimentation and thus the equivalent diameter of the particles as well as their distribution are determined for the present invention by using the sedimentation method, i.e., a sedimentation analysis in a gravimetric field using the Sedigraph 5100 from the company Micromeritics, USA. Those skilled in the art are familiar with this method and this apparatus which are used throughout the world for determining the degree of fineness of fillers and pigments. Their measurement is performed in an aqueous solution of 0.1 wt % $Na_4P_2O_7$. The samples were dispersed using a high-speed stirrer and ultrasound.

In a preferred aspect, the pigment microparticles and/or filler microparticles are inorganic particles, e.g., talc, mica or mixtures thereof. Dolomite is not suitable as a microparticle according to this invention. Suitable talc qualities are distributed by MONDO Minerals, for example. Mica may also be used such as that available from Aspanger Bergbau and Mineralwerke GmbH, Austria, for example.

The pigment and/or filler particles preferably have an essentially spherical structure, in particular, a hollow spherical, hollow hemispherical or platelet-like structure, where "hemispherical" structure is understood to refer to any structure derived from a hollow sphere having a surface that is not closed. Platelet-like and hollow hemispherical micropigments and/or microfillers have proven to be especially advantageous because they have a good holdout due to their shape. Platelet-like particles are understood here to be particles in which the ratio of length to width and/or height is >1.

Inorganic microparticle pigments and/or fillers are preferably platelet-like.

The inventive pigment and/or filler particles may also be organic particles, however, e.g., based on polyethylenes, polypropylenes, polyethylene terephthalates, polystyrenes or mixtures thereof. Organic pigments and/or fillers that can be used in the present invention include those distributed by Rohm & Haas, for example, under the brand name Ropaque, e.g., Ropaque® HP-1055 or Ropaque® AF-1353. The advantage of organic microparticles in the composite is derived, among other things, from the different physical properties such as density, conductivity and colour of organic materials in comparison with inorganic mineral substances.

In a preferred aspect, the organic pigment particles and/or filler particles have an essentially spherical structure, preferably a hollow spherical or hollow hemispherical structure. In the case of hollow spherical particles, they may also contain liquids, e.g., water which may be removed from the hollow spheres in any additional physical steps such as drying, during and/or after use in the present invention. The advantage of hollow spheres lies in the lower specific gravity in comparison with filled spheres, among other things. Any object such as paper or plastic produced therefrom will therefore also be lighter, which may be an advantage in shipping for example. Due to the closed hollow sphere or open hollow hemisphere, the result is an increased amount of light scatter, which leads to an increased opacity, among other things. Also, the closed hollow sphere, e.g., filled with air, has a thermal insulation effect. This may be an advantage for use in interior and exterior wall paint and coatings on buildings.

In a preferred aspect, the equivalent diameter of the pigment and/or filler particles is essentially in a range of more than 0.2 to about 100 μm, e.g., from about 0.3 to about 100 μm, preferably in a range from about 0.3 to about 75 μm, more preferably in a range from about 0.3 to about 50 μm, even more preferably in a range from about 0.3 to about 25 μm, most preferably in a range from about 0.3 to about 15 μm, in particular in a range from about 0.3 to about 12 μm.

The equivalent diameter of the organic pigment and/or filler particles is preferably in a range of more than 0.2 to 25 μm, more preferably in a range from about 0.3 to about 10 μm, e.g., in a range from about 0.4 to about 1.5 μm, or about 0.7 to about 1.4 μm, in particular from about 0.9 to about 1.1 μm.

Organic pigment and/or filler particles based on polystyrene, e.g., in the form of polystyrene hollow spheres having a spherical equivalent diameter of about 0.3 to about 2 μm, preferably about 0.4 to about 1.5 μm, e.g. about 1.3 μm to 1.4 μm, especially preferably about 0.9 to about 1.1 μm, e.g., about 1 μm are especially advantageous in the present invention.

Inorganic pigment and/or filler particles based on talc, where about 95 to 98 wt %, e.g., 96 wt % of the talc particles have a spherical equivalent diameter of <10 μm, about 79 to 82 wt %, e.g., 80 wt % have a spherical equivalent diameter of <5 μm and about 43 to 46 wt %, e.g., 45 wt % have a spherical equivalent diameter of less than 2 μm are also advantageous.

Dolomite according to the present invention means dolomite rock. Dolomite rock is a special carbonate rock predominantly consisting of dolomite mineral, i.e., a carbonatic calcium-magnesium-mineral having the chemical composition of $CaMg(CO_3)_2$ ("$CaCO_3.MgCO_3$"). Dolomite mineral contains at least 30 wt % $MgCO_3$, preferably more than 35 wt %, more than 40 wt %, ideally 45 to 46 wt % $MgCO_3$.

In comparison with limestone predominantly consisting of calcium carbonate, $CaCO_3$, dolomite rock is harder and more brittle and has a higher density. It is distinguished therefrom, as being treated with cold acid dolomite shows almost no reaction, while limestone decomposes effervescently (formation of $CO_2$).

Especially preferred according to the present invention for the nano dolomite applied for the coating is the use of ground natural dolomite rock containing at least 50 wt.-, preferably more than 75 wt % dolomite mineral, more preferably more than 90 wt %, especially preferably more than 98 wt % dolomite mineral.

Especially suitable dolomites for the present invention are found, for example, in Europe, e.g., Norway, or South America. Dolomite from South West Norway, from the region around Bergen, is used especially preferably.

In a special aspect, about 90% to 100%, preferably 92% to 99%, more preferably 94% to 98%, especially preferably 96% to 98%, e.g., 97±0.5% of the dolomite particles, based on the number N of the dolomite particles, have a spherical equivalent diameter of less than 200 nm, preferably less than 150 nm, even more preferably less than 100 nm. The diameter is preferably in a range of 20 to 200 nm, 50 to 180 nm or 70 to 150 nm.

The particle size distribution was measured with the sedimentation method as described above using a Sedigraph 5100 apparatus from the company Micromeritics, USA and printed as a throughput summation curve using an X-Y plotter, where the X axis indicates the particle diameter as the corresponding spherical equivalent diameter and the Y axis indicates the corresponding particle content in weight percent (see for example P. Belger, Schweizerische Vereinigung der Lack- and Farben-Chemiker, XVII FATIPEC Congress, Lugano, Sep. 23-28, 1984).

The percentage of the particle count N % of nanoparticles was calculated from the measurement results thus obtained using the following method:

The values are taken from the Sedigraph curve. The difference between 0 and 0.2 μm yields the 0.1 μm value (100 nm), the difference between 0.2 and 0.4 μm yields the 0.3 μm value (300 nm), etc. The sum of differences is standardized to 100 mg and the quantities of each range are calculated from this. In the calculation, it is assumed that the particles are spherical and have a diameter d of the average of the difference range. This is used to calculate the volume V of a particle $$V=0.5236d^3$$

and then the weight W of a particle (divided by the specific density; for dolomite, this corresponds to 2.9 g/cm$^3$)

$$W=V/2.9$$

By dividing the particle weight, the number of particles can be calculated from the weight of the respective fraction and then used to calculate the percentage distribution in N %.

If the dolomite to be used does not yet have the desired or required fineness, i.e., particle size, it may be ground in one or more wet or dry grinding steps, preferably several grinding steps, e.g., two dry and/or wet steps, preferably aqueous grinding steps, to yield the corresponding spherical equivalent diameter.

The grinding may be performed in any of the known grinding equipment with which those skilled in the art are familiar for grinding dolomite. Conventional ball mills, jet plate mills or attritor mills are especially suitable for dry grinding. Combinations of such mills or combinations of one or more such mills with cyclones and screens are also very suitable. Especially conventional attritor mills such as those distributed by the company Dynomill are suitable for wet grinding.

In the case of dry grinding, preferably ball mills are used and preferably iron and/or porcelain beads with a diameter of 0.5 to 10 cm are used as grinding media, especially preferably iron-cylpebs with a diameter of 2.5 cm are used. Wet grinding preferably is performed in an attritor mill such as a Dynomill using grinding balls made of glass, porcelain, and/or metal; preferably, however, grinding balls are used made of, e.g., zirconium silicate, zirconium dioxide and/or baddeleite with a diameter of 0.2 to 5 mm, preferably 0.2 to 2 mm, but also 0.5 to 5 mm, e.g., 0.5 to 2 mm. Quartz sand having an equivalent spherical diameter of 0.1 to 2 mm may also be used.

The dolomite particles in the nanometer range are preferably produced by wet grinding and/or are brought to the desired equivalent diameter, in particular when the material is natural dolomite.

Both dry and wet grinding steps may be performed one after the other, but then the last grinding step is preferably a wet grinding.

The natural ground dolomite may be dispersed and/or ground in the form of an aqueous slurry in the presence of one or more grinding aids and/or dispersants, preferably at a solids content of more than 10 wt %, e.g., 15 to 30 wt %, more than 30 wt %, preferably more than 50 wt %, e.g., at a solids content of 65 to 68 wt %, but also of more than 70 wt %, e.g., at a solids content of 72 to 80 wt %.

Without grinding aids and/or dispersants, the dolomite may preferably be dispersed and/or ground at a solids content of up to 30 wt %, e.g., 15 to 30 wt %. At a solids content of more than 30 wt %, it may be better to perform the dispersion and/or grinding in the presence of grinding aids and/or dispersants.

Dolomite slurries having a low solids content of less than or equal to 60 wt %, for example, may preferably be concentrated by physical means, e.g., by filter pressing and/or centrifuging and/or thermally, preferably using one or more dispersants. Combinations of mechanical and thermal concentration steps are especially preferred. The final concentration after the concentration steps is preferably greater than 60 wt % solids content, especially preferably between 60 wt % and 78 wt %, e.g., 66±2 wt %.

For example, anionic grinding aids and/or dispersants may be used as the grinding aids and/or dispersant, preferably selected from the group comprising homo- or copolymers of polycarboxylic acid salts based on, e.g., acrylic acid, methacrylic acid, maleic acid, fumaric acid or itaconic acid, acryl amide or mixtures thereof. Homopolymers or copolymers of acrylic acid such as those available from BASF, Ludwigshafen, Allied Colloids, Great Britain or COATEX, France are especially preferred. The molecular weight Mw of such products is preferably in the range of 2000 to 150000 g/mol; a Mw of 15000 to 50000 g/mol, e.g., 35000 to 45000 g/mol is especially preferred. The molecular weight of the grinding aids and/or dispersants is selected so that they act as parting agents rather than as binders. The polymers and/or copolymers may be neutralized with monovalent and/or polyvalent cations or they may have free acid groups. Suitable monovalent cations include for example sodium, lithium, potassium and/or ammonium. Suitable polyvalent cations include for example divalent cations such as calcium, magnesium, strontium or trivalent cations such as aluminium. Sodium and magnesium are especially preferred. Grinding aids and/or dispersants such as sodium polyphosphates or sodium citrate may also be used to advantage either alone or in combination with others.

Especially in dry grinding, the grinding agents and/or dispersants used may also be selected from the group comprising glycols, polyglycols, e.g., polyethylene glycols, ethylene oxide-propylene oxide-ethylene oxide block copolymers or alkanolamines, e.g., triethanolamine and triisopropanolamine or a mixture thereof.

The dispersants and/or grinding aids may be used in an amount of about 0.01 wt % to 5 wt %, based on the total dry weight of the composite, e.g., in dry grinding in an amount of about 0.01 to 0.5 wt %, preferably 0.03 to 0.3 wt %, especially preferably in an amount of 0.2 to 1 mg/m$^2$ nanoparticle surface area, e.g., in an amount of 0.3 to 0.7 mg/m$^2$ nanoparticle surface area.

In wet grinding, the dispersants and/or grinding aids are advantageously present in an amount of about 0.05 to 2.0 wt %, preferably in an amount of 0.3 to 1.5 wt %, e.g., 1 wt %, but also in an amount of about 0.5 to 0.95 wt %.

The grinding aids and/or dispersants support the grinding of the dolomite particles down to the nano range by reducing the viscosity of the slurry and thereby increasing the mobility and free path length of the particles to be ground and the grinding beads. This is also especially advantageous in subsequent formation of the composite.

The viscosity of the slurry in wet grinding is preferably less than 2500 mPa·s, more preferably less than 1500 mPa·s, in particular less than 1000 mPa·s, or better yet, less than 500 mPa·s and especially preferably in the range from 50 to 500 mPa·s, e.g. 50 to 250 mPa·s, measured on a conventional Brookfield viscometer, e.g., EV-2+ type with a disk spindle of 3 or 4 and 100 rpm.

It is also possible during grinding and/or dispersing to use other monomeric or polymeric additives in addition to the grinding aids and/or dispersants, e.g., ethylene-acrylic acid copolymers (EAA) or salts thereof alone or in combination. The ratio of acrylic acid monomers in the copolymer with ethylene monomers is preferably 1:4 to 1:50, especially preferably 1:4 to 1:10 and especially 1:5. The preferred EAAs and/or their salts are those which in the unneutralised form have a melt viscosity of 3000 to 25000 mPa·s, 15000 to 100000 mPa·s and 50000 to 400000 mPa·s at 200, 170 and 140° C., respectively, preferably 3000 to 7000 mPa·s, 15000 to 20000 mPa·s and 50000 to 100000 mPa·s at 200, 170 and 140° C., respectively, and in particular have a melt viscosity of 15000 to 25000 mPa·s, 50000 to 100000 mPa·s and 300000 to 400000 mPa·s at 200, 170 and 140° C., respectively.

An EAA copolymer having a melt viscosity of 24300 mPa·s at 200° C., 88300 mPa·s at 170° C. and 367000 mPa·s at 140° C. is especially preferred.

Commercially available EAAs that are very suitable and preferably have an acrylic acid content of 20 mol % are distributed by BASF, Germany, and Dow, USA, for example.

The use of EAA copolymers or their salts results in a partial to complete hydrophobisation of the pores of the substrate, e.g., the coated paper and/or the pores of the composite itself so that wetting of the open pores of the paper and/or the coating and/or the composite by water is reduced, controlled and/or prevented.

If the EAA salts are used, they are partially or completely neutralized, e.g., with amines, preferably selected from the group comprising 2-amino-2-methyl-1 propanol, 3-amino-1-propanol, 2-[bis(2-hydroxyethyl)amino]ethanol and/or alkali metal ions such as potassium, lithium and/or sodium or mixtures thereof, preferably sodium. For example, at least 70 mol % or at least 95 mol % of the carboxylic acid groups are neutralized.

EAAs and their salts may be used in an amount of 0.01 wt % to 10 wt %, based on the total dry weight of the composite, preferably 0.05 to 5 wt %, more preferably 0.1 wt % to 2 wt %, e.g., in an amount of 1 wt %.

The inventive composite preferably contains, based on the total dry weight of the composite, 5 to 95 wt %, more preferably 20 to 80 wt %, even more preferably 25 to 75 wt % pigment particles and/or filler particles. The inventive composite preferably contains 95 to 5 wt %, preferably 80 to 20 wt %, more preferably 75 to 25 wt % dolomite particles, based on the total dry weight of the composite.

The pigment particles and/or filler particles and the nano-dolomite are preferably used in a ratio of 1:20 to 20:1, especially in a ratio of 1:4 to 4:1, more preferably in a ratio of 1:3 to 3:1 or 1:2 to 2:1, but also in a ratio of 1:1, based on the dry weight. The weight ratio of inorganic and/or organic pigment and/or filler particles to nano-dolomite is most especially preferably 1:3 or 3:1.

The binder used in the inventive composite consists of a copolymer, comprising as monomers one or more dicarboxylic acids and one or more monomers from the group of diamines, triamines, dialkanolamines or trialkanolamines.

It facilitates adhesion of the nanoparticles to the surface of the microparticles.

Preferably saturated or unsaturated branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, especially adipic acid are used as the dicarboxylic acid monomers.

Linear and branched chain, substituted and unsubstituted diamines and triamines are especially suitable as the second monomer of the binder polymer, especially N-(2-aminoethyl)-1,2-ethanediamine. Dialkanolamines and trialkanolamines that are preferred for use include for example diethanolamine, N-alkyldialkanolamines, such as N-methyl- and N-ethyldiethanolamine and triethanolamine.

To control and regulate the molecular weight, i.e., the chain length, one or more monovalent amines such as monoalkanolamines may be used during polycondensation. Monoethanolamine is preferably used.

In a preferred aspect within the scope of the present invention, a copolymer that is also crosslinked with epichlorohydrin is used as the binder.

In an especially preferred embodiment of the present invention, a copolymer of adipic acid with N-(2-aminoethyl)-1,2-ethanediamine and epichlorohydrin is used as the binder.

The binder may also contain other aids for copolymerization or other conventional aids and additives, e.g., isocyanates.

Based on the total dry weight of the composite, the binder is advantageously present in an amount of about 0.1 to about 10 wt %, preferably about 0.3 to about 5 wt %, especially preferably about 0.5 to about 3 wt %.

In comparison with known composites containing materials with a high content of calcium carbonate such as marble, limestone and chalk, the inventive composite has a significantly improved acid stability.

The composites according to the present invention have such a high acid stability in week acids with a $pK_a$ of >4 such as acetic acid that after 1 hour of storage of the composite in 2.5 molar acid having a $pK_a$>4, at 23° C., at least 50 wt %, preferably at least 60 wt %, more preferably at least 70 wt %, but also more than 75 wt %, and after 12 hours of storage, at least 30 wt %, preferably at least 40 wt %, more preferably at least 45 wt %, but also more than 50 wt % of the dolomite component is still present.

Another aspect of this invention is a method for manufacturing the inventive composite, wherein the pigment microparticles and/or filler microparticles, the nano-dolomite composition, and the binder are provided and mixed. The binder here is either added to the pigment and/or filler particles or to the dolomite composition and the resulting mixture is combined with the respective second component and homogenized.

In an alternative aspect, pigment particles and/or filler particles are first mixed with the dolomite composition and the resulting reaction mixture is combined with the binder and homogenized.

However, an aqueous solution or slurry of the binder may also be provided first with the pigment microparticles and/or filler microparticles being added first to the aqueous solution or slurry and then the nano-dolomite composition being added, or with the nano-dolomite composition being added first and the then the pigment microparticles and/or filler microparticles being added, or with the pigment microparticles and/or filler microparticles and the nano-dolomite composition being added simultaneously and then homogenized.

In principle, both the pigment microparticles and/or filler microparticles as well as the nano-dolomite composition may be used either dry or as an aqueous slurry. If the pigment and/or filler microparticles and the nano-dolomite composition are used dry, however, enough water must be used first to yield an aqueous slurry.

The nano-dolomite composition is usually provided in the form of an aqueous slurry, while the pigment microparticles and/or filler microparticles may be used in solid form or in the form of an aqueous slurry. The inorganic pigment and/or filler microparticles are often preferably used in solid form and the organic pigment and/or filler microparticles are often preferably used as an aqueous slurry.

The term “solid” as used here is not necessarily to be understood as meaning “dry.” The term “solid” should be used to describe only the consistency of the substance used, which may have a considerable moisture content. For example, a mixture of 80 wt % inorganic pigment microparticles and/or filler microparticles with 20 wt % water may nevertheless have a solid consistency.

The binder is preferably provided in the form of an aqueous slurry, especially preferably as a solution.

To ensure better dispersion, one or more dispersants may also be added to each of the slurries or mixtures, except for the binder solution or slurry, e.g., in the form of a powder or an aqueous solution. The dispersant(s) may be added, for example, after addition of the binder to the resulting reaction mixture or before addition of the binder to the pigment and/or filler particles or before the addition of the dolomite composition to the component to which the binder is subsequently added or the component that is mixed in.

Advantageous dispersants include, for example, polyacrylic acid salts such as the sodium salt, sodium polyphosphate or polyacrolein/acrylate copolymers.

In addition, however, cationic and/or amphoteric polymeric dispersants may also be added, e.g., polydiallyldimethylammonium chloride (PolyDADMAC) or copolymers of acrylic acid with cationic monomers or mixtures of such dispersants. Such products are described, for example, in DE 40 18 162 and are available from the company Stockhausen GmbH, Krefeld under the name Prästol, for example.

These dispersants may additionally be added to the binder in an amount of 0.01 wt % to 1 wt %, based on the total dry weight of the composite, preferably in an amount of 0.1 wt % to 0.5 wt %, e.g., 0.25 wt %. They support the adsorption of the binder.

Mixing and homogenizing the slurry of the pigment and/or filler particles and/or the dolomite composition including the admixture and stirring of the binder may be performed with a Pendraulik-type stirrer, preferably at room temperature.

It is likewise possible to mix and homogenize the slurries in particular when the pigment and/or filler particles are first combined with the binder by using a ploughshare mixer. Ploughshare mixers function according to the principle of the mechanically produced fluidized bed. Ploughshare blades rotate close to the inside wall of a horizontal cylindrical drum and convey the components of the mixture out of the product bed into the open mixing space. The mechanically produced fluidized bed ensures an intense mixing effect even with large batches in a very short period of time. Choppers and/or dispersers are used to disperse lumps when operating dry. The equipment used is available from the company Gebrüder Lödige Maschinenbau GmbH, Paderborn, Germany.

If the slurry of the dolomite composition is not added until the pigment and/or filler particles have already been pretreated with the binder, this may be accomplished, for example, by means of a tubular mixing apparatus, e.g., by pumping the slurry with the help of a centrifugal pump through the tubular mixing apparatus and continuously introducing the slurry of pretreated pigment and/or filler particles into the tubular mixing apparatus through an intake tube. Such a tubular mixing apparatus is available, for example from Ystral GmbH, Ballrechten-Dottingen, Germany.

Mixing is performed at a room temperature of about 20° C. to 25° C. Heating during the production process, e.g., due to friction during the dispersion process need not be counteracted. For example, the temperature during the process may usually be 20° C. to 90° C., preferably between 20° C. and 70° C.

A combination of various mixing systems may also be used.

The composites obtained by the inventive production process may be dried so that the composite is obtained as solids, but they may also be processed further as a slurry and as a renewed aqueous slurry of the dried composite so that not only the inventive composite per se but also an aqueous slurry thereof constitutes an aspect of the present invention.

The water content of the composite slurries obtained by the inventive production process can be reduced, e.g., thermally, e.g., with a spray dryer or a microwave or in an oven or mechanically, e.g., by filtration so that the composite is obtained as a dry or moist solid, e.g., in the form of a filter cake. To obtain a dried composite, it is dried for example in an oven at 105° C. until reaching a constant weight.

Additional aspects of the present invention constitute the use possibilities of the composite whether in a solid, moist or dry state or as an aqueous slurry.

Thus one of the main uses of the composite or a slurry thereof is its use as a filler or pigment, e.g., in paper and/or as a coating pigment.

The composite may be used as a filler or pigment in papermaking or in paper finishing, e.g., in coating paper.

In papermaking, the composite is preferably used in amounts of 0.5 to 50 wt %, preferably 1 to 30 wt %, based on the total weight of the paper. In paper finishing, e.g., in coating paper, preferably amounts of the inventive composite of 0.5 to 100 g/m$^2$ are used, preferably 2 to 50 g/m$^2$, especially preferably 5 to 25 g/m$^2$ per side of paper.

The composite may also be used in multiply coated systems, e.g., in the pre-coating and/or intermediate coating and/or top coating and/or single coating. If the composite is a pre-coating and/or intermediate coating, another application of coating may be applied thereto using conventional pigments with which those skilled in the art are familiar. The composite may be used for paper coated on one or both sides, in which case one or more of the coats on one or both sides will contain the composite.

The paper which is coated on one or both sides or is uncoated may be calandered paper as well as uncalandered paper.

Through a targeted choice of the composite with regard to its composition and size, the pore volume of the paper and/or the coating may also be varied by coverage or noncoverage by the composite particles, e.g., enlarged and controlled.

The inventive composite may also be used together with other conventional pigments and/or fillers.

The subject of the present invention thus also includes fillers or pigments comprising an inventive composite or a slurry thereof.

Another aspect of the present invention is the use in paints or plastics, e.g., to increase the opacity. The composites here comprising hollow spherical organic microparticles may in particular also induce an increase in the thermal insulation effect.

Likewise, the inventive composites may also be used to reduce the sheen because of their structure. The term "sheen" is understood to refer to a gloss formed when a surface is observed at a very shallow angle; this often has a very irritating effect on the observer. To reduce sheen, a very diverse scattering is required, which can be provided by the inventive composites.

The inventive composites may also be used in sealing substances, e.g., as thickeners or viscosity control agents.

Due to the platelet-like structure of the inorganic micropigments and/or microfillers such as talc and/or mica and the surface properties of dolomite, the inventive composite allows the use of a "platelet-like dolomite" for example.

Due to the hollow spherical structure of the organic micropigments and/or fillers such as polystyrene hollow beads and the surface properties of dolomite, the inventive composite also allows the use of a "light dolomite" in plastics and paints, for example, which may be advantageous in aeronautical engineering, for example.

Another aspect of the present invention relates to the use of the inventive composite or a slurry thereof as a filtration aid, which is suitable for the use with weakly acidic liquids, either alone as a filter layer or in or on a natural and/or synthetic carrier material such as cotton fibres, cellulose fibres and polyamide fibres. Due to the porous structure and low segregation of the composites, this yields an optimal liquid transfer with a good retention power of suspended particulate matter at the same time.

The use of the inventive composites as filtration aids, also for weakly acidic media, on the one hand avoids and/or reduces a too strong impairment of the liquid to be filtered by decomposing components of the filtering aid material, and, on the other hand, allows for a fast and efficient filtration.

The present invention thus also relates to a filtration aid comprising an inventive composite or a slurry thereof.

Another aspect of the present invention relates to a coating colour comprising an inventive composite.

Such a coating colour preferably has a solids content of 25 to 75 wt % solids, more preferably 30 to 70 wt % solids, especially preferably 30 to 40 wt % solids. The amount of composite based on the total solids content of the coating colour may be 3 to 97 wt %, preferably between 10 and 90 wt %. It is especially preferably 85±10 wt %.

In view of the excellent binding properties of the inventive binders in the inventive composites, especially with regard to the surprisingly good binding of the nanoparticles of the dolomite on the microparticle surface, finally another aspect of the present invention involves the use of a copolymer comprising as monomers one or more dicarboxylic acids and one or more monomers from the group of diamines, triamines, dialkanolamines or trialkanolamines for at least partial coating of pigment and/or filler particles with a composition comprising nano-dolomite such as those described above. Use of a copolymer of adipic acid with N-(2-aminoethyl)-1,2-ethanediamine and epichlorohydrin as the binder is especially preferred.

The figures described below and the examples and experiments serve to illustrate the present invention and should not restrict it in any way.

EXAMPLES

Production and Description of Nanoparticles that can be Used According to the Present Invention The production of a known nano-calcium carbonate composition as well as of the nano-dolomite compositions suitable for the inventive composites is described below.

In the following, viscosity measurements always relate to Brookfield viscosity, which is determined in a Brookfield viscometer of EV-2+ type with a disk spindle of 3 and at 100 rpm at room temperature (20±3° C.), unless otherwise indicated.

The nano-calcium carbonate composition was ground continuously using Northern Norwegian marble having a spherical equivalent diameter of 45 μm by wet grinding in a vertical 1500 liter attritor ball mill in two passes using a total of 0.95 wt % sodium/magnesium polyacrylate with a Mw of about 6000 g/mol, based on the total dry weight of the nano-calcium carbonate as dispersant/grinding aid, at a solids content of 75 wt % to yield the following size distribution:

| Diameter (nm) | Number (N) of particles in N % | Wt % |
|---|---|---|
| <200 | 97.4 | 34.4 |
| 200-400 | 2.0 | 19.2 |
| 400-600 | 0.4 | 17.9 |
| 600-800 | 0.1 | 11.7 |
| 800-1000 | <0.1 | 6.5 |

The Brookfield viscosity of the slurry obtained was 285 mPa·s.

The grinding beads that were used, made of zirconium silicate and baddeleite were 0.5 to 2 mm in size.

Nano-Dolomite Composition 1

Step a)

100 kg of Southern Norwegian dolomite rock with a diameter of up to 10 cm was crushed with a hammer mill without the addition of any additives, such that a rock fraction was obtained having a portion of >90 wt % of the particles in the range of 45 μm to 5 mm.

| Screen fraction after hammer mill: | Wt % |
|---|---|
| >5 mm | 2 |
| 1-5 mm | 20 |
| 500 μm-1 mm | 21 |
| 45-500 μm | 48 |
| <45 μm | 9 |

The fraction of 45-500 μm had the following mineralogical composition (XRD):

| | |
|---|---|
| >95 wt % | dolomite |
| about 1.5 wt % | quartz |
| about 3 wt % | calcite |

Step b)

25 kg of the product from the hammer mill was ground and classified to a spherical equivalent diameter of 5 μm (±0.3 μm) by a combination of dry grinding and classifying, using 1000 ppm monopropylene glycol based on dry dolomite. As a ball mill a "Hosokawa™ Ball Mill S.O. 80/32" (distributed by the company HOSOKAWA™) was used. As grinding balls, 100 kg Iron-Cylpebs™ having an average diameter of 25 were used. At the outlet of the mill a classifier of the Alpine Turboplex™ 100 ATP type (distributed by the company ALPINE™) was installed.

Step c)

10 kg of the obtained dry ground dolomite intermediate having a spherical equivalent diameter of 5 μm (±0.3 μm) was ground continuously by wet grinding in a recirculating horizontal 2 liter attritor ball mill (Dynomill) using a total of 1.4 wt % sodium polyacrylate with a Mw of about 35000 to 40000 g/mol, based on the total dry weight of the nano dolomite as dispersant/grinding aid, at a solids content of 65.6 wt % to further yield the following size distribution:

| Diameter (nm) | Number (N) of particles in N % | Wt % |
|---|---|---|
| <200 | 97.4 | 23.7 |
| 200-400 | 2.2 | 14.4 |
| 400-600 | 0.6 | 17.3 |
| 600-800 | 0.2 | 16.4 |
| 800-1000 | <0.1 | 12.1 |

The Brookfield viscosity of the slurry obtained was 325 mPa·s.

The grinding beads that were used, made of zirconium silicate and baddeleite were 0.5 to 2 mm in size.

Nano-Dolomite Composition 2

100 kg of Southern Norwegian dolomite rock was treated as described above in step a) and b) to yield an equivalent diameter of 5 μm (±0.3 μm)

10 kg of the obtained dry ground dolomite intermediate having a spherical equivalent diameter of 5 μm (±0.3 μm) was then ground continuously by wet grinding in a recirculating horizontal 2 liter attritor ball mill (Dynomill) using a total of 1.60 wt % sodium polyacrylate with a Mw of about 35000 to 40000 g/mol, based on the total dry weight of the nano dolomite as dispersant/grinding aid, at a solids content of 69.4 wt % to yield the following size distribution:

| Diameter (nm) | Number (N) of particles in N % | Wt % |
|---|---|---|
| <200 | 98.0 | 33.6 |
| 200-400 | 1.5 | 13.6 |
| 400-600 | 0.4 | 15.3 |
| 600-800 | 0.1 | 14.1 |
| 800-1000 | <0.1 | 10.2 |

The Brookfield viscosity of the slurry obtained after production was 1460 mPa·s.

The grinding beads that were used, made of zirconium silicate and baddeleite were 0.5 to 2 mm in size.

Description of Microparticles that can be Used According to the Invention

Organic Microparticles 1: Ropaque® HP-1055 Slurry (Rohm & Haas):

Particle size: relatively uniform 1.0 μm

The particle size was determined by SEM.

Solids content: 26.1 wt % (determined at 120° C., 2 hours in an oven)

Organic Microparticles 2: Ropaque® AF-1353 Slurry (Rohm & Haas):

Particle size: 1.3 to 1.4 μm

The particle size was determined by SEM.

Solids content: 29.0 wt % (determined at 120° C., 2 hours in an oven)

Inorganic Microparticles 1: Finntalc C 10 Slurry, Aqueous Slurry (MONDO Minerals, Finland):

| | |
|---|---|
| Particle size: | 95 wt % <10 μm<br>80 wt % <5 μm<br>45 wt % <2 μm |

The particle size was determined by the sedimentation method using a Sedigraph 5100, Micromeritics, USA.

Solids content: 61.5 wt % (determined at 120° C., 2 hours in an oven)

Inorganic Microparticles 2: Finntalc P 05 Powder, MONDO Minerals, Finland

| | |
|---|---|
| Particle size: | 96 wt % <10 μm<br>79 wt % <5 μm<br>43 wt % <2 μm |

The particle size was determined by the sedimentation method using a Sedigraph 5100, Micromeritics, USA.

Moisture content: <0.5 wt % water (determined at 120° C., 2 hours in an oven)

Description of Binders that can be Used According to the Present Invention

Binder

15±0.5 wt % aqueous solution of a copolymer of adipic acid with N-(2-aminoethyl)-1,2-ethanediamine and epichlorohydrin having the following characteristics:

Total chlorine content: about 1.5 wt %

Organic chlorine content: <0.5 wt %

Mw>1000 g/mol

Brookfield viscosity of the aqueous solution: 80 mPa·s±30 mPa·s pH 3.0

Such products can be produced by two-step synthesis in the manner familiar to those skilled in the art for organic synthesis. Production takes place, for example, by producing an intermediate product consisting of the reaction product of diethylenetriamine, mono-ethanolamine and adipic acid in distilled water. In a second reaction, the resulting intermediate is reacted with epichlorohydrin using sulphuric acid and potassium sorbate as the catalyst to yield the end product, diluted with water to a solids content of 12 to 20 wt % and the pH is adjusted to pH 3 with more sulphuric acid. Such copolymers are sold by the company Lanxess, Germany and the company Mare in Italy, e.g., as Nadavin, e.g., Nadavin DHN (15%).

EXAMPLES

1. Organic Microparticles with Inorganic Nanoparticles

Comparative Experiment 1: Mixture of Organic Particles 1 and Nano-Calcium Carbonate Composition 750 g based on dry matter of the nano-calcium carbonate composition, was mixed with 250 g based on the dry matter of the slurry of organic microparticles 1, in a Pendraulik agitator with a toothed disk with a diameter of 3.5 cm as the stirrer and a stirrer speed of 7500 rpm at a starting temperature of 22° C. for 15 minutes while stirring. The final temperature after mixing was 45° C.

The resulting mixture had the following characteristics:

Brookfield viscosity measured after 5 min/60 min/120 min: 77/79/81 mPa·s pH 8.23

Solids content: 52.22 wt %

FIG. 1 shows clearly that the nano-calcium carbonate is segregated from the organic microparticles. Only a small portion of the 75 wt % nano-calcium carbonate can be seen in the SEM.

A filter test was performed to illustrate the segregation tendency and to determine the filtration speed by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time to filter 200 mL was measured. When segregation occurs, nano-calcium carbonate passes through the pores first but over a period of time a secondary filter cake forms on the membrane filter and blocks the pores.

Filtering time: >24 hours (the experiment was stopped). After 10 hours, there was still 90 mL of slurry to be filtered. No permeable secondary filter bed was formed.

The filtering time shows clearly the segregation of nanoparticles and microparticles.

Comparative Experiment 2: Mixture of 25 wt % Organic Microparticles 1 and 75 wt % Nano-Dolomite Composition 1

750 g based on dry matter of the nano-calcium carbonate composition 1, was mixed with 250 g based on the dry matter of the slurry of organic microparticles 1, in a Pendraulik agitator with a toothed disk with a diameter of 3.5 cm as the stirrer and a stirrer speed of 7500 rpm at a starting temperature of 22° C. for 15 minutes while stirring. The final temperature after mixing was 41° C.

The resulting mixture had the following characteristics:

Brookfield viscosity measured after 5 s/60 s/120 s: 145/150/165 mPa·s pH 9.1

Solids content: 47.6 wt %

Figure 2:
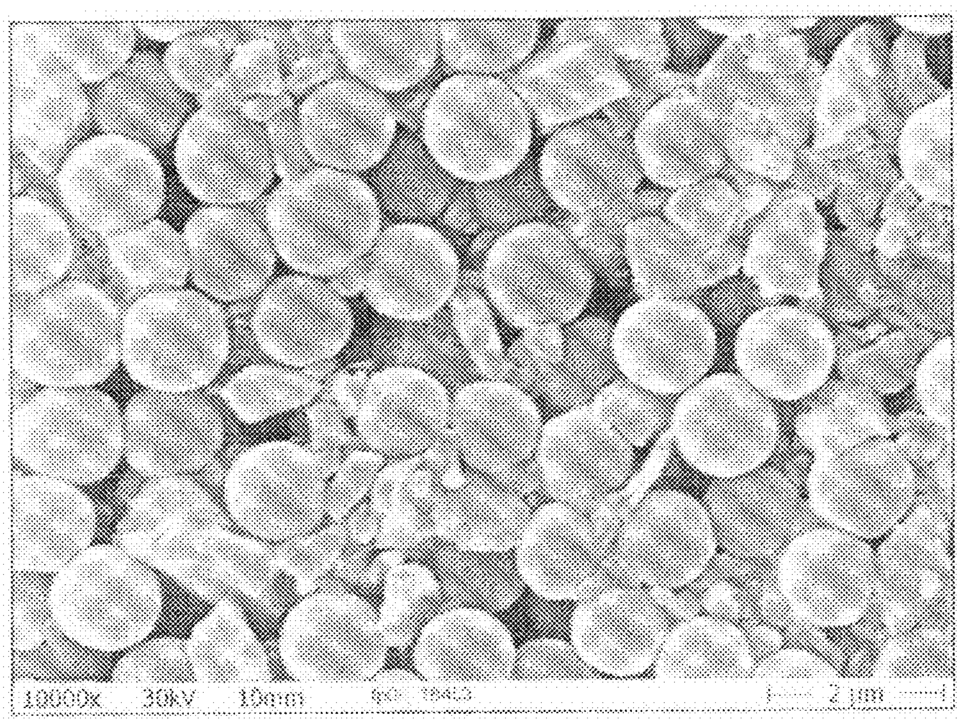
FIG. 2 shows the SEM of a mixture of organic microparticles and nano-dolomite without a binder.

FIG. 2 shows clearly that the nano-dolomite is segregated from the organic microparticles. Only a small portion of the 75 wt % nano-dolomite can be seen in the SEM.

A filter test was performed to illustrate the segregation tendency and the formation of the secondary filter layer by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time to filter 200 mL was measured. When segregation occurs, nano-dolomite passes through the pores first but over a period of time a secondary filter cake which is almost impermeable forms on the membrane filter and blocks the pores.

Filtering time: 14 hours. No permeable secondary filter bed was formed.

The filtering time shows clearly the segregation of nanoparticles and microparticles.

Comparative Experiment 3: Composite of 25 wt % Organic Microparticles 1 and 75 wt % Nano-Calcium Carbonate Composition and Binder 2100 g of the nano-calcium carbonate composition was placed in the Pendraulik and 1944.4 g of the slurry of organic microparticles 1 was stirred into the composition during 2 minutes. The solids content was diluted with water to a concentration of 50 wt %; 272.7 g binder as an aqueous solution with a solids content of 15.4 wt % was stirred into this mixture during another 2 minutes and diluted with water to a solids content of 35 wt %. The resulting reaction mixture was sheared for 15 minutes, whereby after half of the shearing time, the pH was adjusted to 9 with 10 wt % NaOH and dispersed with 0.525 wt %, based on the total solids content of a 42 wt % active aqueous solution of a sodium salt of polyacrylic acid (Mw: about 4000 g/mol; pH 8.5). The Pendraulik stirrer was equipped with a toothed disk having a diameter of 3.5 cm and the stirring speed was 7500 rpm. The starting temperature was 21° C. and the final temperature after the 15-minute shearing time was 38° C.

The resulting composite slurry had the following characteristics:

Brookfield viscosity measured after 5 min/60 min/120 min: 610/580/583 mPa·s pH 9.04

Solids content: 35.1 wt %

Figure 3:
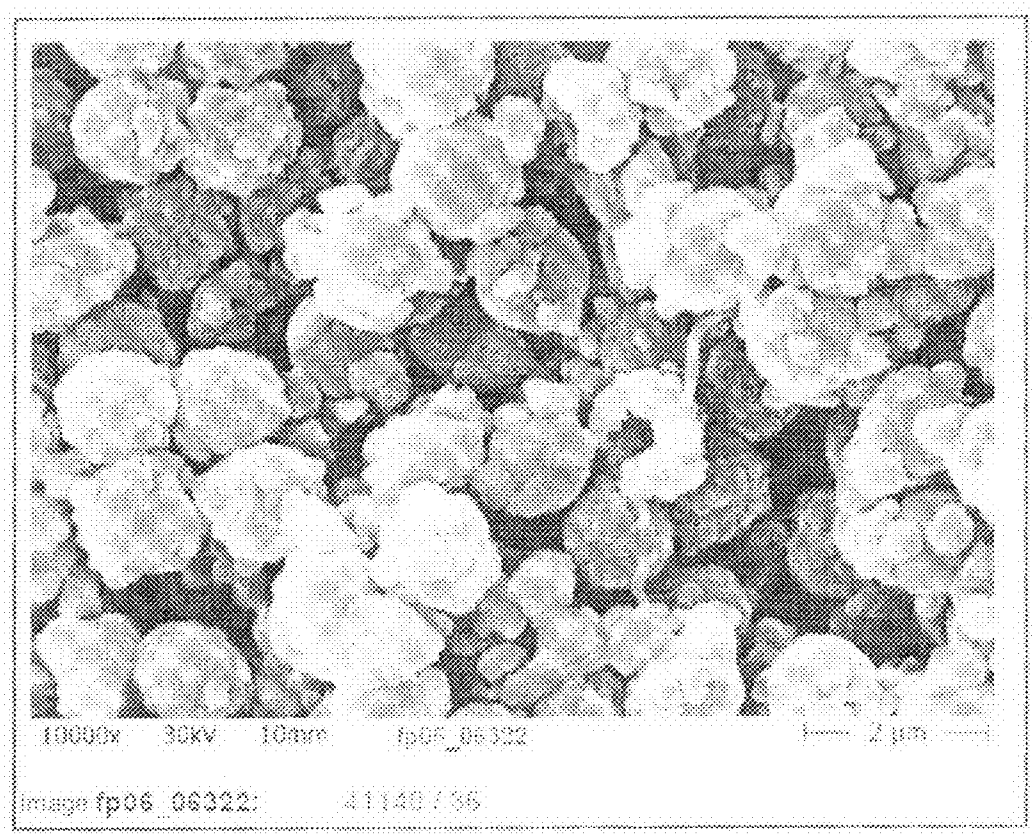
FIG. 3 shows the SEM of a known composite of organic microparticles, nano-calcium carbonate and a binder.

FIG. 3 shows clearly that the nano-calcium carbonate is not segregated from the organic microparticles and is on the surface of the organic microparticles. It is easy to see that the pore volume in experiment 3 has been increased significantly in comparison with that in experiment 1.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 nm (pressure: about 25 mbar, water suction pump; room temperature). The time required to filter 200 mL was measured. When segregation occurs, nano-calcium carbonate first passes through the pores but over a period of time a secondary filter cake forms on the membrane filter and blocks the pores.

Filtering time: 1.5 hours.

The filtering time shows clearly that the segregation of nanoparticles and microparticles was reduced significantly. Almost no secondary filter cake of nano-calcium carbonate was formed on the membrane filter blocking the pores. The filtration time was very short due to the open structure of the composite in comparison with experiment 1.

Acid Stability in Slightly Acidic Medium:

3 samples with 4 g each based on the dry matter of the composite corresponding to 3 g nano-calcium carbonate based on the dry matter, were stored at 23° C. for the time mentioned below each in 100 ml 2.5 molar acetic acid. The samples spontaneously start effervescing releasing $CO_2$. After filtering the filter residue was dried at 105° C. for 3 h.

The following results were obtained:

| Sample | Storage time before filtration [h] | Weight composite [g] | Weight $CaCO_3$ | % $CaCO_3$ of the starting weight $CaCO_3$ |
|---|---|---|---|---|
| 1 | 1 | 1.09 | 0.095 | 3.2 |
| 2 | 12 | 1.03 | 0.03 | 1.0 |
| 3 | 80 | 1.00 | <0.01 | <0.1 |

The same type of membrane filter was used as for the segregation tests.

This experiment clearly shows that the nano-calcium carbonate composites are not acid resistant.

Experiment 4: Composite of 25 wt % Organic Microparticles 1 and 75 wt % Nano-Dolomite Composition 1 and Binder 700 g of the nano-dolomite composition 1 was placed in the Pendraulik and 566.9 g of the slurry of organic microparticles 1 was stirred into the composition during 2 minutes. The solids content was diluted with water to a concentration of 50 wt %; 79.5 g binder as an aqueous solution with a solids content of 15.4 wt % was stirred into this mixture during another 2 minutes and diluted with water to a solids content of 35 wt %. The resulting reaction mixture was sheared for 15 minutes, whereby after half of the shearing time, the pH was adjusted to 9 with 10 wt % NaOH and dispersed with 0.1 wt %, based on the total solids content of a 42 wt % active aqueous solution of a sodium salt of polyacrylic acid (Mw: about 4000 g/mol; pH 8.5). The Pendraulik stirrer was equipped with a toothed disk having a diameter of 8 cm and the stirring speed was 7500 rpm. The starting temperature was 21° C. and the final temperature after the 15-minute shearing time was 39° C.

The resulting composite slurry had the following characteristics:

Brookfield viscosity measured after 5 s/60 s/120 s: 838/810/805 mPa·s pH 8.9

Solids content: 36.5 wt %

Figure 4:
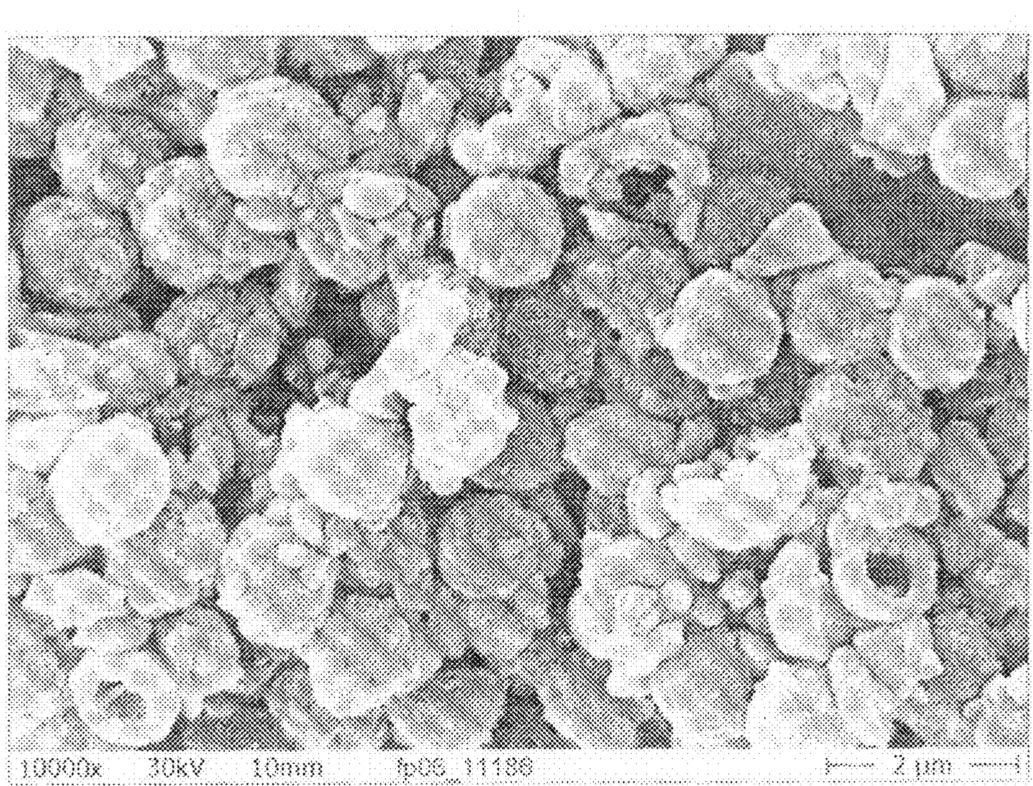
FIG. 4 shows the SEM of an inventive composite of organic microparticles, nano-dolomite and a binder.

FIG. 4 shows clearly that the nano-dolomite is not segregated from the organic microparticles and is on the surface of the organic microparticles.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time required to filter 200 mL was measured.

Filtering time: 0.5 hours.

The filtering time shows clearly that the segregation of nanoparticles and microparticles is even lower than using nano-calcium carbonate. Almost no secondary filter cake of nano-dolomite was formed on the membrane filter blocking the pores. The filtration time was very short due to the open structure of the composite in comparison with experiments 1, 2 and 3.

Acid Stability in Slightly Acidic Medium:

3 samples with 4 g each based on the dry matter of the composite corresponding to 3 g nano-dolomite based on the dry matter, were stored at 23° C. for the time mentioned below each in 100 ml 2.5 molar acetic acid. The samples show no spontaneous release of $CO_2$ and no spontaneous effervescence. After filtering the filter residue was dried at 105° C. for 3 h.

The following results were obtained:

| Sample | Storage time before filtration [h] | Weight composite [g] | Weight dolomite | % dolomite of the starting weight dolomite |
|---|---|---|---|---|
| 1 | 1 | 3.10 | 2.10 | 70.1 |
| 2 | 12 | 2.29 | 1.29 | 43.0 |
| 3 | 80 | 1.25 | <0.25 | <8.3 |

The same type of membrane filter was used as for the segregation tests.

This experiment clearly shows that the nano-dolomite composites with organic micropigment have a very high acid resistance and even after long storage times in acidic media for several days still have a significantly higher acid stability than comparable nano-calcium carbonate composites.

Experiment 5: Composite of 25 wt % Organic Microparticles 2 and 75 wt % Nano-Dolomite Composition 1, Binder and Ethylene-Acrylic Acid-Copolymer (EAA):

350 g of the nano-dolomite composition 1 and 264.1 g of the slurry of organic microparticles 2 was stirred during 2 minutes in the Pendraulik stirrer, type LD 50 with toothed disk having a diameter of 3 cm. The solids content was diluted with water to a concentration of 50 wt %; 40.8 g binder as an aqueous solution with a solids content of 15.4 wt % was stirred into this mixture during another 2 minutes and diluted with water to a solids content of 35 wt %. The resulting reaction mixture was sheared for 15 minutes with the Pendraulik agitator at a stirring speed of 2800 rpm, whereby after half of the shearing time, the pH was adjusted to 9 with 1.9 g of 10 wt % NaOH and dispersed with 0.1 wt %, based on the total solids content of a 42 wt % active aqueous solution of a sodium salt of polyacrylic acid (Mw: about 4000 g/mol; pH 8.5). Subsequently, 2 wt % of a solution of a sodium salt of an ethylene-acrylic acid polymer (Na-salt of the commercially available product Primacor 5980i; 11.75%) was introduced under the same stirring conditions and homogenized for 10 minutes. The starting temperature was 21° C. and the final temperature after the 15-minute shearing time was 41° C.

The resulting composite slurry had the following characteristics:

Brookfield viscosity measured after 5 s/60 s/120 s: 244/230/231 mPa·s pH 9.34

Solids content: 34.2 wt %

Figure 5:
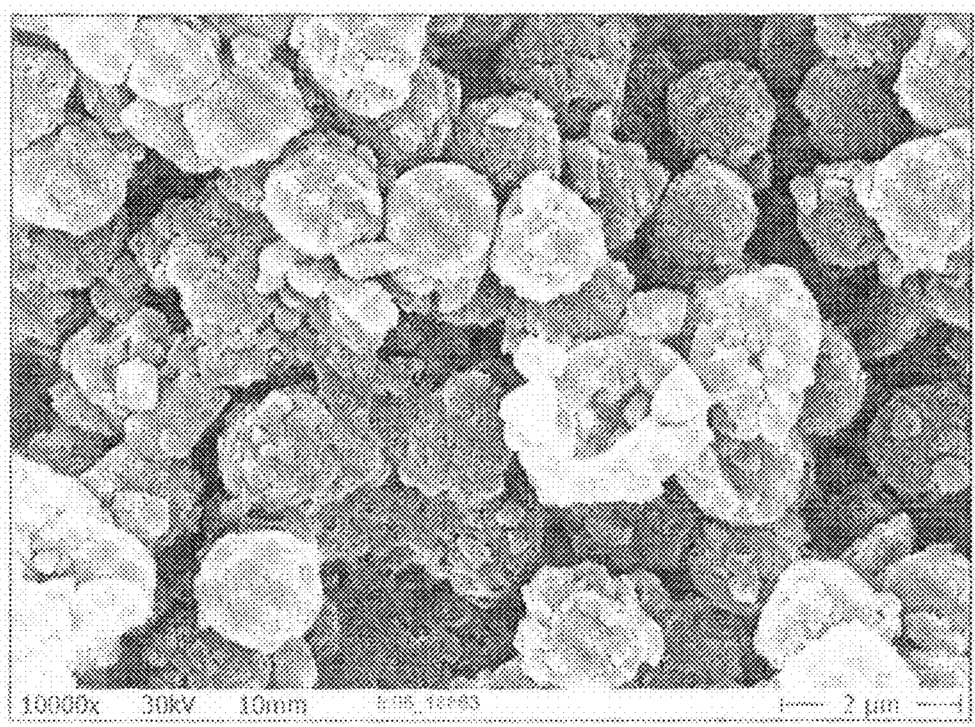
FIG. 5 shows the SEM of an inventive composite of organic microparticles, nano-dolomite, a binder and an EAA copolymer.

FIG. 5 shows clearly that the nano-dolomite is not segregated from the organic microparticles and is on the surface of the organic microparticles.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 nm (pressure: about 25 mbar, water suction pump; room temperature). The time required to filter 200 mL was measured.

Filtering time: 2.5 hours.

The filtering time shows clearly that the segregation of nanoparticles and microparticles is low. Only a small secondary filter cake of nano-dolomite is formed on the membrane filter blocking the pores. The filtration time is very short due to the open structure of the composite in comparison with experiments 1, 2 and 4.

Acid Stability in Slightly Acidic Medium:

3 samples with 4 g each based on the dry matter of the composite corresponding to 3 g nano-dolomite based on the dry matter, were stored at 23° C. for the time mentioned below each in 100 ml 2.5 molar acetic acid. The samples show no spontaneous release of $CO_2$ and no spontaneous effervescence. After filtering the filter residue was dried at 105° C. for 3 h.

The following results were obtained:

| Sample | Storage time before filtration [h] | Weight composite [g] | Weight dolomite | % dolomite of the starting weight dolomite |
|---|---|---|---|---|
| 1 | 1 | 3.00 | 2.00 | 66.7 |
| 2 | 12 | 2.50 | 1.50 | 50.0 |
| 3 | 80 | 1.70 | 0.70 | 23.3 |

The same type of membrane filter was used as for the segregation tests.

This experiment clearly shows that the nano-dolomite composites with organic micropigment have a very high acid resistance and even after long storage times in acidic media for several days still have a significantly higher acid stability than comparable nano-calcium carbonate composites.

2. Inorganic Microparticles with Inorganic Nanoparticles

Comparative Experiment 6: Mixture of 25 wt % Inorganic Microparticles 1 and 75 wt % Nano-Dolomite Composition 1

750 g based on dry matter of the nano-calcium carbonate composition 1, was mixed with 250 g based on the dry matter of the slurry of inorganic microparticles 1, in a Pendraulik agitator with a toothed disk with a diameter of 3.5 cm as the stirrer and a stirrer speed of 7500 rpm at a starting temperature of 22° C. for 15 minutes while stirring. The final temperature after mixing was 48° C.

The resulting mixture had the following characteristics:

Brookfield viscosity measured after 5 s/60 s/120 s: 160/160/152 mPa·s pH 8.4

Solids content: 64.4 wt %

Figure 6:
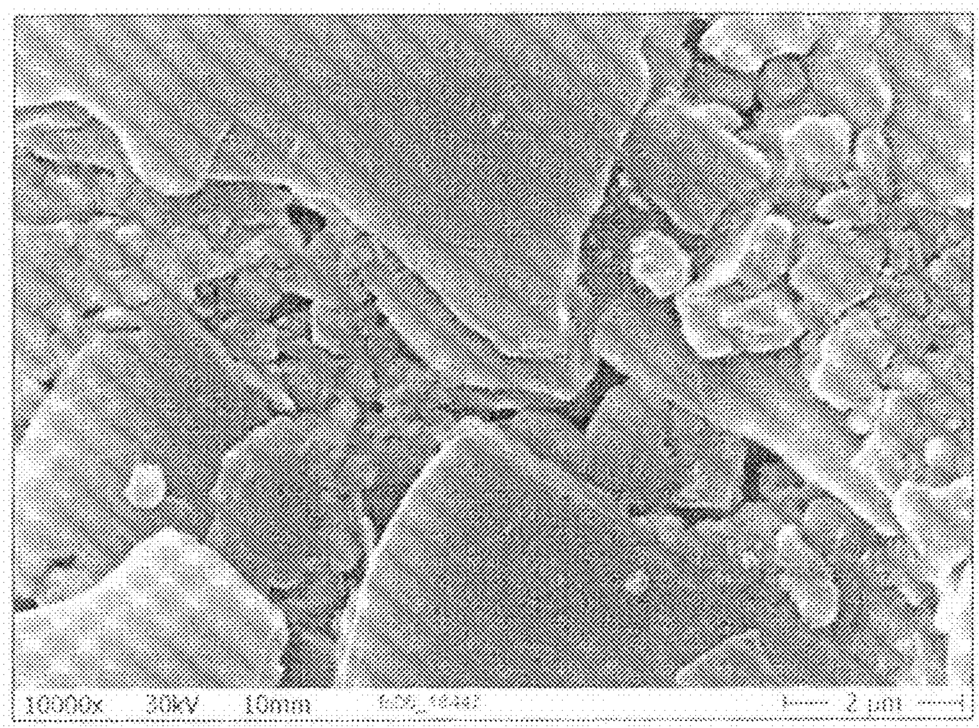
FIG. 6 shows the SEM of a mixture of inorganic microparticles and nano-dolomite.

FIG. 6 shows clearly that the nano-dolomite is segregated from the inorganic microparticles. Only a small portion of the 75 wt % nano-dolomite can be seen in the SEM.

A filter test was performed to illustrate the segregation tendency and to determine the filtration speed by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time to filter 200 mL was measured. When segregation occurs, nano-dolomite passes through the pores first but over a period of time a secondary filter cake forms on the membrane filter and blocks the pores.

Filtering time: >20 hours (The experiment was stopped). No permeable secondary filter bed was formed.

The filtering time shows clearly the segregation of nanoparticles and microparticles.

Experiment 7: Composite of 25 wt % Inorganic Microparticles 2, 75 wt % Nano-Dolomite Composition 2 and Binder:

800 g based on the dry matter of inorganic microparticles 2 were placed in a ploughshare mixer, model M 5 R, Lödige, Germany, and 106.7 g aqueous solution of the binder was added within 1 minute with the stirrer running and then homogenized for another 10 minutes. The solids content of the intermediate was 89 wt % after adding the binder.

800 g nano-dolomite composition 2 was placed in a Pendraulik stirrer, type LD 50 with toothed disk having a diameter of 3 cm and mixed with 85.5 g water. After a short homogenisation time of 2 min 219.6 of the above intermediate having a solids content of 89 wt % were added and mixed intensely for 15 minutes at a stirring speed of 2800 rpm. Then 1.4 g of a 42 wt % aqueous solution of a sodium salt of polyacrylic acid (Mw: about 4000 g/mol; pH 8.5) were added and mixed for further 5 min.

The resulting composite slurry had the following characteristics:

Brookfield viscosity measured after 5 min/60 min/120 min: 229/224/236 mPa·s pH 9.03

Solids content: 66.6 wt %

Figure 7:
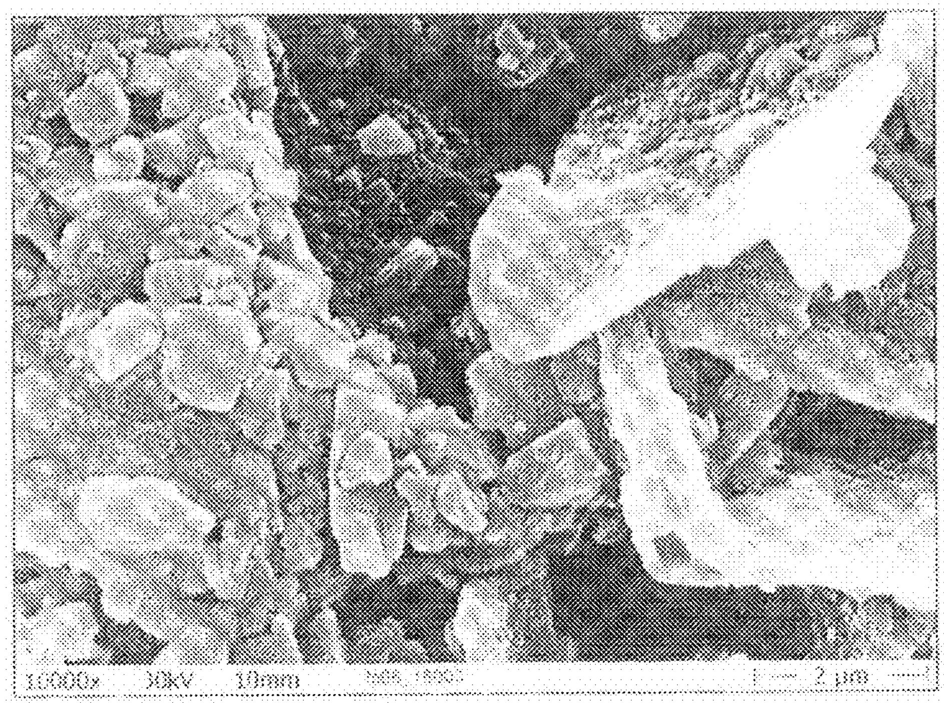
FIG. 7 shows the SEM of an inventive composite of inorganic microparticles, nano-dolomite and a binder.

FIG. 7 shows clearly that the nano-dolomite is not segregated from the inorganic microparticles and is on the surface of the inorganic microparticles.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 μm (pressure: about 25 mbar, water suction pump; room temperature). The time required to filter 200 mL was measured.

Filtering time: 2.5 hours.

There is only very little segregation. The filtration time is short in comparison with comparative experiment 6.

Acid Stability in Slightly Acidic Medium:

3 samples with 4 g each based on the dry matter of the composite corresponding to 3 g nano-dolomite based on the dry matter, were stored at 23° C. for the time mentioned below each in 100 ml 2.5 molar acetic acid. The samples show no spontaneous release of $CO_2$ and no spontaneous effervescence. After filtering the filter residue was dried at 105° C. for 3 h.

The following results were obtained:

| Sample | Storage time before filtration [h] | Weight composite [g] | Weight dolomite | % dolomite of the starting weight dolomite |
|---|---|---|---|---|
| 1 | 1 | 3.30 | 2.30 | 76.7 |
| 2 | 12 | 2.65 | 1.65 | 55.0 |
| 3 | 80 | 1.77 | 0.77 | 25.7 |

The same type of membrane filter was used as for the segregation tests.

This experiment clearly shows that the nano-dolomite composites with inorganic micropigment have a very high acid resistance and even after long storage times in acidic media for several days still have a significantly higher acid stability than comparable nano-calcium carbonate composites.

3. Combination of Inorganic Microparticle/Nano-Dolomite Composite and Organic Microparticle/Nano-Dolomite Composite

Experiment 8: Composite of 50 wt % Composite of Experiment 4 and 50 wt % Composite of Experiment 7

145 g product from experiment 4 (solids content: 36.5 wt %) and 75 g product from experiment 7 (solids content: 66.6 wt %) are mixed together and homogenized in a Pendraulik stirrer, type LD 50 with toothed disk having a diameter of 3 cm for 10 min. at a stirring speed of 930 rpm.

The resulting composite slurry has the following characteristics:

Brookfield viscosity measured after 5 min/60 min/120 min: 613/537/521 mPa·s pH 8.47

Solids content: 45.6 wt %

Figure 8:
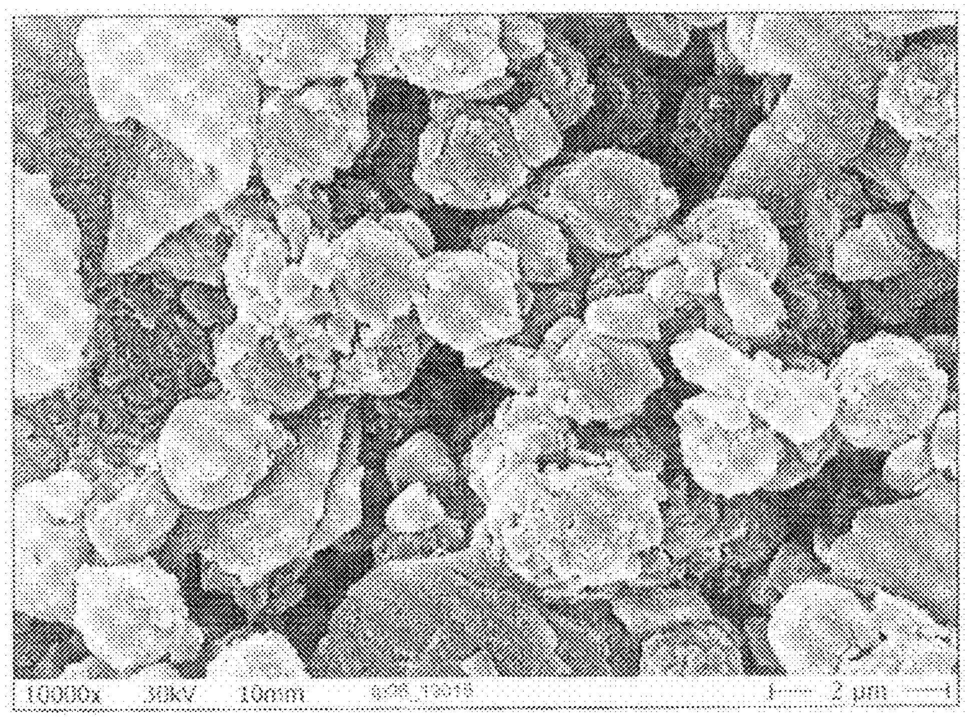
FIG. 8 shows the SEM of a combination of an inventive inorganic and an inventive organic microparticle/nano-dolomite composite.

FIG. 8 shows clearly that the nano-dolomite is neither segregated from the organic nor from the inorganic microparticles and is on the surface of the inorganic and organic microparticles.

A filter test was performed to illustrate the segregation tendency by preparing 200 mL of a slurry with 0.5 wt % solids content of the nanoparticle/microparticle mixture and filtering the slurry using a membrane filter with a pore diameter of 0.2 nm (pressure: about 25 mbar, water suction pump; room temperature). The time required to filter 200 mL was measured.

Filtering time: 1.0 hours.

There is only very little segregation.

The invention claimed is:

1. A composite comprising:

(i) 20 to 80 wt. %, based on the total dry weight of the composite, of microparticles having a spherical equivalent diameter of 0.3 μm to 12 μm, wherein the microparticles are organic microparticles comprising polyethylene, polypropylene, polyethylene terephthalate, polystyrene or any mixture thereof, and wherein the microparticles have a spherical structure, a hollow spherical structure, or a hollow hemispherical structure;

(ii) 80 to 20 wt. %, based on the total dry weight of the composite, of a dolomite nanoparticle composition at least partially coating the microparticles, wherein ≥90% of particles of the dolomite nanoparticle composition, based on the number N of particles, have a spherical equivalent diameter of 20 nm to 200 nm, wherein the dolomite nanoparticle composition is ground natural dolomite that is ground in the presence of one or more grinding aids and/or dispersants, and wherein the dolomite nanoparticle composition contains more than 90% dolomite and one or more grinding aids and/or dispersants;

(iii) 0.3 to 3 wt. %, based on the total dry weight of the composite, of a binder that facilitates adhesion of the microparticles with the dolomite nanoparticle composition, wherein the binder is a copolymer comprising one or more dicarboxylic acids, and one or more diamines, triamines, dialkanolamines or trialkanolamines, and (iv) optionally one or more additional dispersants, wherein the sum of the weight amounts of the microparticles, the dolomite nanoparticle composition, the binder, and grinding aids and/or dispersants is 100% of the composite.

2. The composite according to claim 1, wherein the microparticles have an essentially spherical structure.

3. The composite according to claim 1, wherein the microparticles have a hollow spherical or hollow hemispherical structure.

4. The composite according to claim 1, wherein the spherical equivalent diameter of the organic microparticles is 0.9 μm to 1.1 μm.

5. The composite according to claim 1, wherein the spherical equivalent diameter of the organic microparticles is 0.7 μm to 1.4 μm.

6. The composite according to claim 1, wherein the spherical equivalent diameter of the organic microparticles is 0.4 μm to 1.5 μm.

7. The composite according to claim 1, wherein the organic microparticles comprise polystyrene.

8. The composite according to claim 1, wherein the organic microparticles are in the form of polystyrene hollow spheres with a spherical equivalent diameter of 0.3 μm to 2.0 μm.

9. The composite according to claim 1, wherein the dolomite nanoparticle composition contains more than 98 wt % dolomite mineral.

10. The composite according to claim 1, wherein 92 to 99% of particles of the dolomite nanoparticle composition, based on the amount N of particles, have a spherical equivalent diameter in a range from 20 to 200 nm.

11. The composite according to claim 1, wherein the dolomite is ground to the spherical equivalent diameter in one or more dry or wet grinding steps.

12. The composite according to claim 11, wherein a ball mill, a jet plate mill, an attritor mill or combinations of such mills or combinations of one or more of such mills with a cyclone and screen is/are used for the grinding.

13. The composite according to claim 11, wherein the dry grinding is performed in a ball mill using iron and/or porcelain balls with a diameter of 0.5 to 10 cm.

14. The composite according to claim 11, wherein the dry grinding is performed in a ball mill using iron-cylpebs with a diameter of 2.5 cm.

15. The composite according to claim 11, wherein the wet grinding is performed in an attritor mill using grinding balls made of zirconium silicate, zirconium dioxide and/or baddeleite with a diameter of 0.2 to 5 mm.

16. The composite according to claim 11, wherein the wet grinding is performed in an attritor mill using grinding balls made of zirconium silicate, zirconium dioxide and/or baddeleite with a diameter of 0.2 to 2 mm.

17. The composite according to claim 11, wherein the wet grinding is performed in an attritor mill using grinding balls made of zirconium silicate, zirconium dioxide and/or baddeleite with a diameter of 0.5 to 5 mm.

18. The composite according to claim 11, wherein the wet grinding is performed in an attritor mill using grinding balls made of zirconium silicate, zirconium dioxide and/or baddeleite with a diameter of 0.5 to 2 mm.

19. The composite according to claim 1, wherein the natural ground dolomite is dispersed and/or ground in the form of an aqueous slurry with a dolomite solids content of more than 10 wt %.

20. The composite according to claim 1, wherein the natural dolomite is dispersed and/or ground in the form of an aqueous slurry with a dolomite solids content of more than 15 to 30 wt %.

21. The composite according to claim 1, wherein the natural ground dolomite is dispersed and/or ground in the form of an aqueous slurry with a dolomite solids content of 72 to 80 wt %.

22. The composite according to claim 1, wherein the dolomite dispersed and/or ground in the form of an aqueous slurry with a dolomite solids content of ≤60 wt %, is physically concentrated by filter pressing and/or centrifuging and/or thermally, or by combinations of mechanical and thermal concentration steps, optionally dispersed in the presence of one or more dispersants, to a final concentration of between 60 wt % and 78 wt %.

23. The composite according to claim 1, wherein the dolomite dispersed and/or ground in the form of an aqueous slurry with a dolomite solids content of ≤60 wt %, is physically concentrated by filter pressing and/or centrifuging and/or thermally, or by combinations of mechanical and thermal concentration steps, optionally dispersed in the presence of one or more dispersants, to a final concentration of 66±2 wt %.

24. The composite according to claim 1, wherein the grinding aids and/or dispersants are anionic grinding aids and/or dispersants.

25. The composite according to claim 24, wherein the anionic grinding aids and/or dispersants comprise homopolymers or copolymers of polycarboxylic acid salts based on acrylic acid, methacrylic acid, maleic acid, fumaric acid, itaconic acid or mixtures thereof, or sodium polyphosphates, sodium citrate or mixtures thereof.

26. The composite according to claim 25, wherein the homopolymers or copolymers of polycarboxylic acid salts are partially or completely neutralized with sodium, lithium, potassium, ammonium, calcium, magnesium, strontium and/or aluminium or mixtures thereof.

27. The composite according to claim 25, wherein the homopolymers or copolymers of polycarboxylic acid salts are partially or completely neutralized with sodium and magnesium.

28. The composite according to claim 1, wherein the dispersants and/or grinding aids are used in wet grinding in an amount of about 0.05 to about 2 wt %.

29. The composite according to claim 1, wherein the viscosity of the dolomite slurry in wet grinding is less than 2500 mPa s.

30. The composite according to claim 1, wherein the viscosity of the dolomite slurry in wet grinding is in the range of 50 to 250 mPa s.

31. The composite according to claim 1, wherein the grinding aids and/or dispersants comprise a glycol, a polyglycol, a polyethylene glycol, an ethylene oxide-propylene oxide-ethylene oxide block copolymer, an alkanolamine, triethanolamine, triisopropanolamine or mixtures thereof.

32. The composite according to claim 1, wherein the dispersants and/or grinding aids in dry grinding are present in an amount of 0.2 to 1 mg/$m^2$ nanoparticle surface area.

33. The composite according to claim 1, containing 25 to 75 wt % of microparticles, based on the total dry weight of the composite.

34. The composite according to claim 1, containing 75 to 25 wt % of dolomite particles, based on the total dry weight of the composite.

35. The composite according to claim 1, wherein one or more saturated or unsaturated, branched or unbranched $C_2$ to $C_{10}$ dicarboxylic acid, $C_3$ to $C_9$ dicarboxylic acid, $C_4$ to $C_8$ dicarboxylic acid, $C_5$ to $C_7$ dicarboxylic acid, or adipic acid is used as one or more dicarboxylic acid monomers of the binder.

36. The composite according to claim 1, wherein one or more linear and branched chain, substituted and unsubstituted diamine and triamine and dialkanolamine and trialkanolamine, N-(2-aminoethyl)-1,2-ethanediamine, diethanolamine, an N-alkyldialkanolamine, N-methyl- and N-ethyldiethanolamine and triethanolamine is used as the one or more diamine, triamine, dialkanolamine or trialkanolamine monomer of the binder.

37. The composite according to claim 1, the copolymer used as the binder is crosslinked with epichlorohydrin.

38. The composite according to claim 1, wherein the binder is a copolymer of adipic acid with N-(2-aminoethyl)-1,2-ethane-diamine and epichlorohydrin.

39. The composite according to claim 1, containing 0.5 to 3 wt % of binder, based on the total dry weight of the composite.

40. An aqueous slurry comprising the composite according to claim 1.

41. A filler or pigment comprising the composite according to claim 1 or an aqueous slurry thereof.

42. Paper comprising the composite of claim 1 or an aqueous slurry thereof in an amount of 0.5 to 50 wt %, based on the total weight of the paper.

43. The paper according to claim 42, wherein the composite is used in the pre-coating, the intermediate coating, the top coating and/or a single coating, and the paper is coated on one or both sides and one or more of the coatings contains the composite on one or both sides.

44. The paper according to claim 42, wherein the composite is used in calendered or uncalendered paper.

45. The paper according to claim 42, wherein the composite is used for modifying for controlling the pore volume of the paper or the coating.

46. A paints, plastic or sealing compound comprising the composite according to claim 1 or an aqueous slurry thereof.

47. Paper comprising the composite of claim 1 or an aqueous slurry thereof as a coating in an amount of 2 to 50 wt % per side of paper.

48. A filtration aid in the form of a filter layer comprising the composite according to claim 1 or an aqueous slurry thereof, optionally on a natural and/or synthetic carrier material such as cotton, cellulose and polyamide fibres.

49. A filtration aid comprising the composite according to claim 1 or an aqueous slurry thereof.

50. A filler comprising the composite according to claim 1 or an aqueous slurry thereof.

51. A pigment comprising the composite according to claim 1 or an aqueous slurry thereof.

52. A coating colour comprising the composite of claim 1 or an aqueous slurry thereof.

53. The coating colour according to claim 52, wherein the coating colour has a solids content of 25 to 75 wt % solids.

54. The coating colour according to claim 52, wherein the amount of the composite, based on the total solids content in the coating colour, is 3 to 97 wt %.

* * * * *